Sept. 16, 1958 P. G. VICARD 2,852,239
APPARATUS FOR TREATING GASES
Filed Jan. 28, 1953

INVENTOR
Pierre Georges Vicard

BY  Michael S. Striker
ATTORNEY

United States Patent Office 2,852,239
Patented Sept. 16, 1958

2,852,239
APPARATUS FOR TREATING GASES
Pierre Georges Vicard, Lyon, France
Application January 28, 1953, Serial No. 333,652
Claims priority, application France February 5, 1952
2 Claims. (Cl. 261—24)

The present invention relates to improvements in devices for treating gases, that is, principally for the purification of gases, these devices being of the type in which the gases to be treated are first submitted to a saturating vapor (principally water vapor), then to a supersaturation, by providing a mist (principally a water mist), before being directed into a convergent-divergent conduit portion, so-called "Venturi," which transforms the atmospheric pressure of the gas into a dynamic pressure, so that a lowering of static pressure results in a drop in temperature which is transmitted very suddenly and uniformly to the innermost parts of the mass of gas, the gas then being sprayed with liquid (principally water) to bring down the dust-carrying mist and transform it into dust-carrying droplets which then pass into a separator which separates from the gas the droplets which are finally carried off, while the purified gas escapes through another part of the apparatus.

One of the objects of the present invention is to provide a means for altering the temperature of the supersaturated gas before it reaches a chamber where it is sprayed with liquid to precipitate the liquid from the supersaturated gas.

Another object of the present invention is to provide a means for recycling a part of the gas being treated.

A further object of the present invention is to provide a means for maintaining the movement of the gas through the recycling means.

An additional object of the present invention is to provide a means for causing part of the apparatus to function in a manner similar to a Venturi.

A still further object of the present invention is to provide a means for causing the gas being treated to move at sonic and even supersonic speeds.

The improvements of the invention are of particular utility when the temperature of the gas being treated is different (lower or higher) from that of the liquid employed in the treatment. These improvements consist in introducing to the throat of a converging-diverging conduit portion (to avoid evaporation of a dust-carrying mist in the diverging portion) a recycled gas, that is, a gas taken, by means of an appropriate derivation apparatus, from a spray chamber located downstream of the divergent conduit portion and guided in part back to the said throat, this spray chamber being supplied, as the case may be, with a liquid which is colder or warmer than the gas being treated. In the former case the cooling already obtained at the said throat is maintained or augmented in this way; and in the latter case, and in the situation where the spray in the above-mentioned chamber would be fine enough to enable the recycled gas to entrain a mist of the liquid used (principally a water mist), it is the mist (the mist of warmer water) which evaporates in the divergent portion rather than the dust-carrying mist mentioned above.

The recycling movement of the gas provided above can be easily maintained by the "horn" effect, of the gas being treated, in the open throat and proportional as a consequence to the particular convergent-divergent portion.

The novel features which are considered as characteristic for the invention are set forth in particular in the appended claims. The invention itself will be best understood from the following description of specific embodiments when read in connection with the accompanying drawings, in which:

Figure 1:
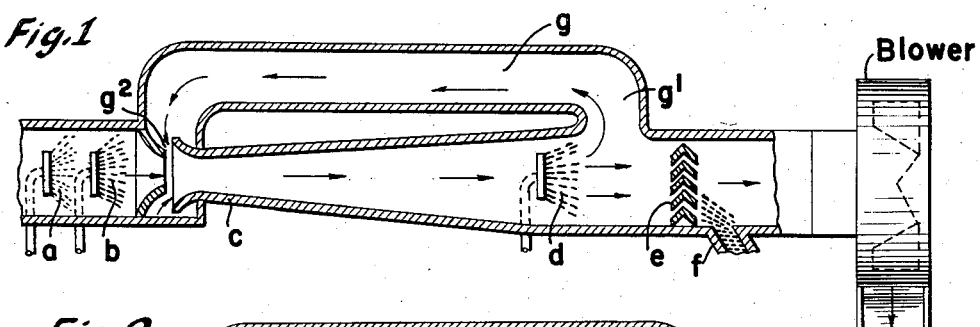
Fig. 1 is a diagrammatic, sectional, elevational view of one apparatus constructed in accordance with the present invention.

The first part of the invention is shown schematically in Fig. 1 of the annexed drawing. Illustrated therein are the humidifying chamber $a$ where the evaporation of the water or treating liquid is produced so as to saturate the gas to be purified, the humidifying chamber $b$ in which the water or treating liquid atomized into a very fine mist cannot evaporate further and remains in suspension as a mist, the convergent-divergent portion $c$ which follows, then the spray chamber $d$, the baffle separator $e$ and finally the discharge orifice $f$ for the dust-carrying water, the purified gas escaping in the direction of the arrow shown at the right end of Fig. 1. Finally, in accordance with the present invention, the drawing illustrates the recycling means $g$ which is in the form of a duct leading from the spray chamber $d$ at $g'$ and returning at $g^2$ a certain quantity or portion of the gas, conveyed at a desired temperature, to the throat of the converging-diverging portion, this throat conveniently being open for this purpose.

The invention which is described and shown in its principal part, further includes the variations which are described hereafter and which permit, in certain cases, the provision of improvements in the treatment of the gas and more especially the obtaining in a still more effective manner of the purification of gases carrying particles which are extremely small, such as, for example, on the order of a tenth of a micron in size, and permitting, in these cases and in certain other cases, the provision of a structure which is inexpensive and capable of producing the desired results.

Figure 2:
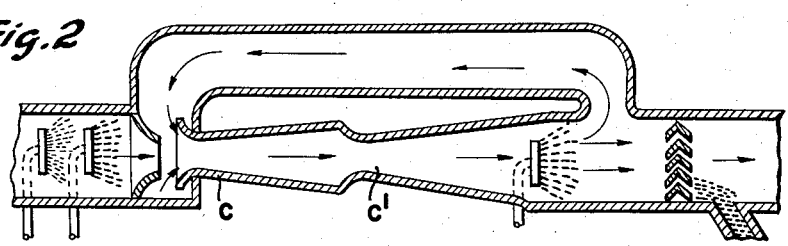
Fig. 2 is a diagrammatic, sectional, elevational view of a second apparatus constructed in accordance with the present invention.
Figure 3:
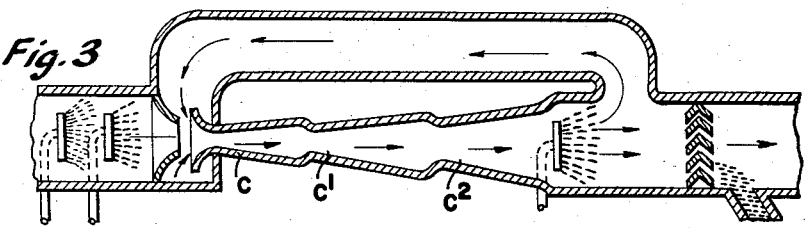
Fig. 3 is a diagrammatic, sectional, elevational view of a third apparatus constructed in accordance with the present invention.

These variations, as in the principal part of the invention which has been described above, all include a means for returning to the throat of the converging-diverging conduit portion gas drawn from the spray chamber located downstream of the divergent portion, this operation being called: recycling of the gas. These variations include:

(1) The application of a plurality of convergent-divergent portions, two, for example, as is schematically shown in Fig. 2, three as shown in Fig. 3, or a greater number if necessary, these convergent-divergent portions being arranged in series. This structure results in repeatedly producing in the gas passing through the convergent portion a lowering in pressure and, as a result, a drop in temperature which increases the effectiveness of the treatment and adds to its efficiency. As was mentioned above, this result is obtained by placing at the downstream end of a converging-diverging portion, before complete diffusion, a second convergent-divergent portion as shown in the drawings only by way of example. This second convergent-divergent portion $c'$, as well as the first portion $c$, should be designed to utilize with a minimum of loss of the charge the kinetic and potential energy imparted to the gas by any appropriate means, such as a blower, for example, which completes the device. The use of two convergent-divergent portions arranged in series and each recuperating a part of the kinetic energy provokes in effect an aerodynamic flow of the gas better than that produced by a single divergent portion. It is possible, in this way, to provide more than two convergent-divergent portions, such as $c'$, $c^2$, in series when such an arrangement is necessary for the treatment of the gas.

Figure 4:
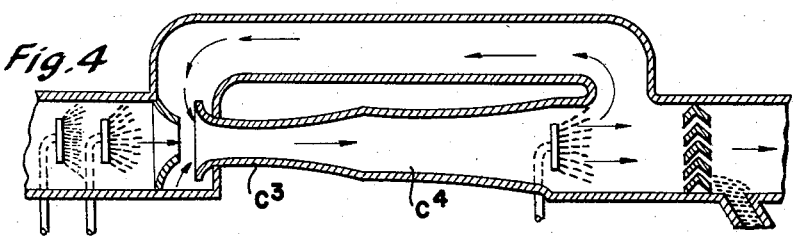
Fig. 4 is a diagrammatic, sectional, elevational view of a fourth apparatus constructed in accordance with the present invention.

(2) The provision of conduits or a conduit system, having a function approaching that of convergent-divergent portions of classical shape, and constructed as shown in Fig. 4, when it is not necessary to repeatedly submit the gas to a lowering of pressure, simply to provide an improvement in the diffusion, these conduits or conduit systems being composed of a succession of tubes having curvilinear surfaces of revolution such as $c^3$, $c^4$, a solution which produces as good an efficiency as the preceding solution and without requiring as great a length.

Figure 5:
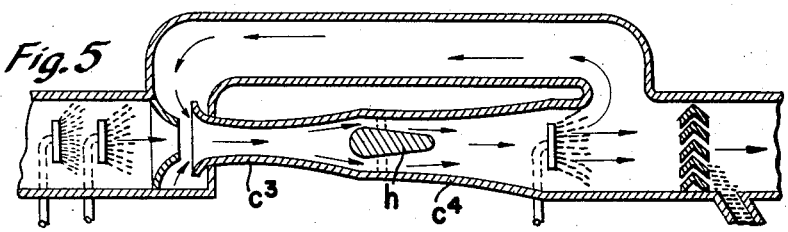
Fig. 5 is a diagrammatic, sectional, elevational view of a fifth apparatus constructed in accordance with the present invention.

(3) The eventual provision, in cases 1 and 2 described above and shown schematically in Fig. 5, of central elongated cores which taper in the downstream direction, such as the core $h$ located at the throat of the complementary convergent portions or at the throat of the pipe system mentioned above, these cores fulfilling at the said complementary throats a function analogous to that of a "Venturi."

(4) The combination of a simple blower of known type, conventionally used, with the Venturi and the complementary convergent-divergent portions or with the complementary tubes having curvilinear surfaces of revolution, with or without the central cores extending in the downstream direction and functioning as a Venturi, as mentioned above, this combination in this case having the effect of producing in the gas passing along this structure a sonic or even supersonic speed.

It will be understood that each of the elements described above, or two or more together, may also find a useful application in other types of improvements in gas treating apparatus differing from the types described above.

While the invention has been illustrated and described as embodied in improvements in gas purifying apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A gas purifying apparatus comprising, in combination, a conduit through which a gas supersaturated with liquid is adapted to flow, having a portion which is divergent in the downstream direction, and being provided with a throat at the upstream end of said divergent portion; a spray chamber located downstream of said divergent portion of said conduit and forming a part thereof; spray means located in said spray chamber to spray the supersaturated gas with liquid so as to precipitate from the gas vapor carried thereby; recycling means leading from said spray chamber to a part of said conduit slightly upstream of said throat thereof for recirculating a part of the gas reaching said spray chamber through said divergent portion of said conduit; and an elongated core member tapering in the downstream direction and being located in the interior of said conduit at said throat thereof and spaced therefrom so that said core member and throat portion of said conduit cooperate to fulfill a function analogous to that of a Venturi.

2. A gas purifying apparatus comprising, in combination, an elongated conduit formed by a plurality of successive parts functioning as a diffuser and being constituted by a series of tubular portions having curvilinear surfaces of revolution, respectively, a gas supersaturated with liquid being adapted to pass through said series of tubular portions; a spray chamber forming part of said conduit and being located downstream of said series of tubular portions thereof; spray means located in said spray chamber to spray the supersaturated gas with liquid to precipitate from the gas vapor carried thereby; recycling means leading from said spray chamber to a part of said conduit located slightly upstream of said series of tubular portions thereof for recirculating a part of the gas reaching said spray chamber through said tubular portions so as to control the temperature of the gas moving along said tubular portions to said spray chamber; blower means associated with the tubular portions of said conduit located downstream of the tubular portion at the upstream end of said series of tubular portions for moving the gas through the tubular portions at at least a sonic speed; and a core member tapering in the downstream direction and located in each tubular portion after the tubular portion at the upstream end of the series of tubular portions, said core members being spaced from the wall of said conduit and cooperating with the latter to fulfill a function analogous to that of a Venturi.

References Cited in the file of this patent

UNITED STATES PATENTS

| | | |
|---|---|---|
| 984,279 | Leblanc | Feb. 14, 1911 |
| 1,175,462 | Leblanc | Mar. 14, 1916 |
| 1,622,945 | Geare et al. | Mar. 29, 1927 |
| 2,020,325 | Myhren et al. | Nov. 12, 1935 |
| 2,066,832 | Gay | Jan. 5, 1937 |
| 2,376,298 | Welp | May 15, 1945 |
| 2,579,282 | Vicard | Dec. 18, 1951 |
| 2,632,523 | Stephens et al. | Mar. 24, 1953 |
| 2,667,340 | Robson | Jan. 26, 1954 |

FOREIGN PATENTS

| | | |
|---|---|---|
| 536,116 | Great Britain | May 2, 1941 |